United States Patent [19]

Ryman

[11] Patent Number: 4,894,646
[45] Date of Patent: Jan. 16, 1990

[54] METHOD AND SYSTEM FOR PROCESSING A TWO-DIMENSIONAL IMAGE IN A MICROPROCESSOR

[75] Inventor: Arthur G. Ryman, Toronto, Canada

[73] Assignee: International Business Machines Corporation, Armonk, N.Y.

[21] Appl. No.: 122,827

[22] Filed: Nov. 19, 1987

[30] Foreign Application Priority Data

Mar. 30, 1987 [CA] Canada ................................. 533370

[51] Int. Cl.$^4$ ............................................. G09G 1/16
[52] U.S. Cl. ................................... 340/747; 340/723; 340/727; 340/731
[58] Field of Search ............... 340/747, 731, 727, 723, 340/791; 364/521, 522

[56] References Cited

U.S. PATENT DOCUMENTS

| | | |
|---|---|---|
| 3,938,102 | 2/1976 | Morrin et al. |
| 3,995,253 | 11/1976 | Morrin II et al. |
| 3,996,559 | 12/1976 | Morrin et al. |
| 4,090,174 | 5/1978 | Van Voorhis. |
| 4,486,745 | 12/1984 | Konno ................................. 340/727 |
| 4,593,407 | 6/1986 | Konishi et al. ...................... 340/727 |
| 4,637,057 | 1/1987 | Kermisch ............................ 340/727 |
| 4,774,506 | 9/1988 | Bossoutrout et al. ............... 340/747 |

OTHER PUBLICATIONS

Antonsson, D., et al. "PICAP—A System Approach to Image Processing," *IEEE Trans. on Computers*, vol. C-31, No. 10, Oct. 1982, pp. 997–1000.

Hashihara, H. et al., "Image Rotation Method Under Virtual Image Management," *IBM Tech. Discl. Bull.*, vol. 29, No. 1, Jun. 1986, pp. 449–452.

Wada, B. T., "A Virtual Memory System for Picture Processing," *Comm. ACM*, vol. 27, No. 5, May 1984, pp. 444–454.

*Primary Examiner*—Gerald Brigance
*Attorney, Agent, or Firm*—Jack M. Arnold; Marc D. Schechter

[57] ABSTRACT

An image processing system and a method for manipulating images in an image processing system where each image in the system is subdivided into a plurality of sub-images which are processed independently of one another. Control of each image and sub-image is maintained by means of a view state word or table so that only those portions of an image which are being actively processed require modification of their view state. The images stored in the system are maintained in a secondary store and only portions of the image are available for manipulation at any one time in a primary store. Manipulation of sub-images is determined by a modified Least Recently Used algorithm which minimizes data swaps between the primary and secondary stores.

21 Claims, 6 Drawing Sheets

VIRTUAL IMAGE SYSTEM OVERVIEW

Image

STEP 0.      (INITIAL STATE)

P = (2,3,4,)  (PRIMARY STORAGE)
S = (1,2,3,4) (ACCESS SET)

STEP 1                            STEP 1

P = (3,4,2)                                    P = (3,4,2)
S = (1,3,4)                                    S = (1,3,4)

STEP 2.                           STEP 2.
SWAP OUT 3
SWAP IN 1
P = (4,2,1)                                    P = (4,2,3)
S = (3,4)                                      S = (1,4)

STEP 3.                           STEP 3.
SWAP OUT 4
SWAP IN 3
P = (2,1,3)                                    P = (2,3,4)
S = (4)                                        S = (1)

STEP 4                            STEP 4.
SWAP OUT 2                                     SWAP OUT 2
SWAP IN 4                                      SWAP IN 1
P = (1,3,4)                                    P = (3,4,1)
S = EMPTY                                      S = EMPTY

LEAST RECENTLY USED ALGORITHM        MODIFIED ALGORITHM

INITIAL STATE
LRU             MODIFIED LRU
P = (1,3,4)     P = (3 4 1)
S = (1,2,3,4)   S = (1,2,3,4)

STEP 5.
SWAP OUT 1
SWAP IN 2
P = (3,4,2)
S = (1,3,4)

STEP. 5.
P = (4,1,3)
S = (1,2,4)

STEP 6.
SWAP OUT 3
SWAP IN 1
P = (4,2,1)
S = (3,4)

STEP 6.
P = (1,3,4)
S = (1,2)

STEP 7.
SWAP OUT 4
SWAP IN 3
P = (2,1,3)
S = (4)

STEP 7.
P = (3,4,1)
S = (2)

STEP 8.
SWAP OUT 2
SWAP IN 4
P = (1,3,4)
S = EMPTY

STEP 8.
SWAP OUT 3
SWAP IN 2
P = (4,1,2)
S = EMPTY

LEAST RECENTLY USED ALGORITHM          MODIFIED ALGORITHM

METHOD AND SYSTEM FOR PROCESSING A TWO-DIMENSIONAL IMAGE IN A MICROPROCESSOR

FIELD OF THE INVENTION

The invention relates to the efficient processing of large digital images where the image storage requirements exceed the capacity of the memory of the processor on which the image data is being processed or in which the addressing capability of the processor is inadequate to handle the image data or both. The invention is useful for rotating, reflecting, inverting, scaling and copying of digital images. It is also useful for pattern filling and graphical annotating.

PRIOR ART

The known image processing systems capable of performing useful processing of an image have traditionally required large amounts of memory. It has been generally accepted that to use a personal computer for such image processing would be impractical except for very specific applications. One attempt to use a personal computer for image processing was provided by the IBM* Personal Computer Image Processing System (PCIPS) which was announced May 7, 1985, as IBM Program Number 6466996. The authors of that program readily acknowledged that it could not do all things one would like to do with images. This restrictive use was necessary because, to use the program, it was necessary to load the entire image being processed into the primary storage of the computer. It was therefore not possible to work interactively between two images except by masking of one area over another. It was also not possible to process only a portion of the image without operating on the whole image to retain the image changes.

* Registered Trade Mark

Images have often been subdivided into sub-images for processing. Usually these sub-images were horizontal or vertical strips of single unit width, however, there have been a few attempts at developing sub-images having a larger second dimension. Some of these attempts are described in articles by Antonsson et al entitled "PICAP - A System Approach to Image Processing", IEEE Transactions on Computers, Vol. C-31, No. 10, October 1982, pp. 997–1000, by Hashihara et al entitled "Image Rotation Method Under Virtual Image Management", in IBM Technical Disclosure Bulletin, Vol. 29, No. 1, June 1986, pp. 449–452, by Wada entitled "A Virtual Memory System for Picture Processing", Computing Practices, Communications of the ACM, Vol. 27, No. 5, May 1984, pp. 444–454, and in U.S. Pat. Nos. 3,938,102, 3,995,253, 3,996,559, and 4,090,174 all assigned to International Business Machines Corporation. Although each of these articles and patents describes an image processing arrangement wherein the image may be processed in rectangular arrays, none provide the advantages of the present invention wherein a significant amount of image processing time is saved by not performing processing operations on portions of the image which may not be required. None of the prior art describes a system in which only portions of the image are processed. When an image processing operation such as, for example, image rotation, is initiated in the prior art, the entire image is rotated, whereas in accordance with the present invention, only the sub-images of the image containing portions of the image to be actually viewed in the rotated state will be rotated. Any sub-images containing only portions of the image which are not to be viewed in the rotated state will not be addressed in storage at all.

OBJECT OF THE INVENTION

A primary object of the invention is to provide a fast image processing system.

Another object is to provide such a system having minimal data storage requirements.

A further object is to provide an image processing system in which data transfer operations are maintained at a minimal level and at minimal cost.

A further object is to provide a two-dimensional image processing system that can rapidly perform image transformations.

The objects of the invention are achieved in a microprocessor controlled system having a display device, a primary store for storing portions of images and a secondary or back-up store for storing complete images. In operation, desired images are stored by loading them into the primary store in pieces as sub-image portions. Each sub-image portion represents a predetermined rectangular portion of the image. The status of each sub-image portion is maintained in a status table. The sub-image portions are transferred to the secondary storage area to enable subsequently received portions to be stored in primary storage. When display of an image is required, the sub-image portions are accessed in accordance with a memory management algorithm. This algorithm is provided with the identity of the image to be accessed, the identity of the sub-image portions of the image to be viewed and the status of the image and each sub-image within the image. It should be noted that the status of the overall image may differ from the status of sub-image portions if the image has been subject to an earlier image processing operation. With the identity and status information, the algorithm is then used to access the required portions of the image. The actual sub-image portions are accessed and provided to the display device in accordance with their accessibility. For example, those sub-images which are located in the primary storage would be provided to the display device before the sub-image portions which must be retrieved from secondary storage. Many other factors influence the sequence of accessing of the sub-image portions as will become more evident from the description hereinafter.

The foregoing and other objects, features and advantages of the invention will be apparent from the following more particular description of the invention as illustrated in the accompanying drawings.

DESCRIPTION OF THE PREFERRED EMBODIMENT

Figure 1:
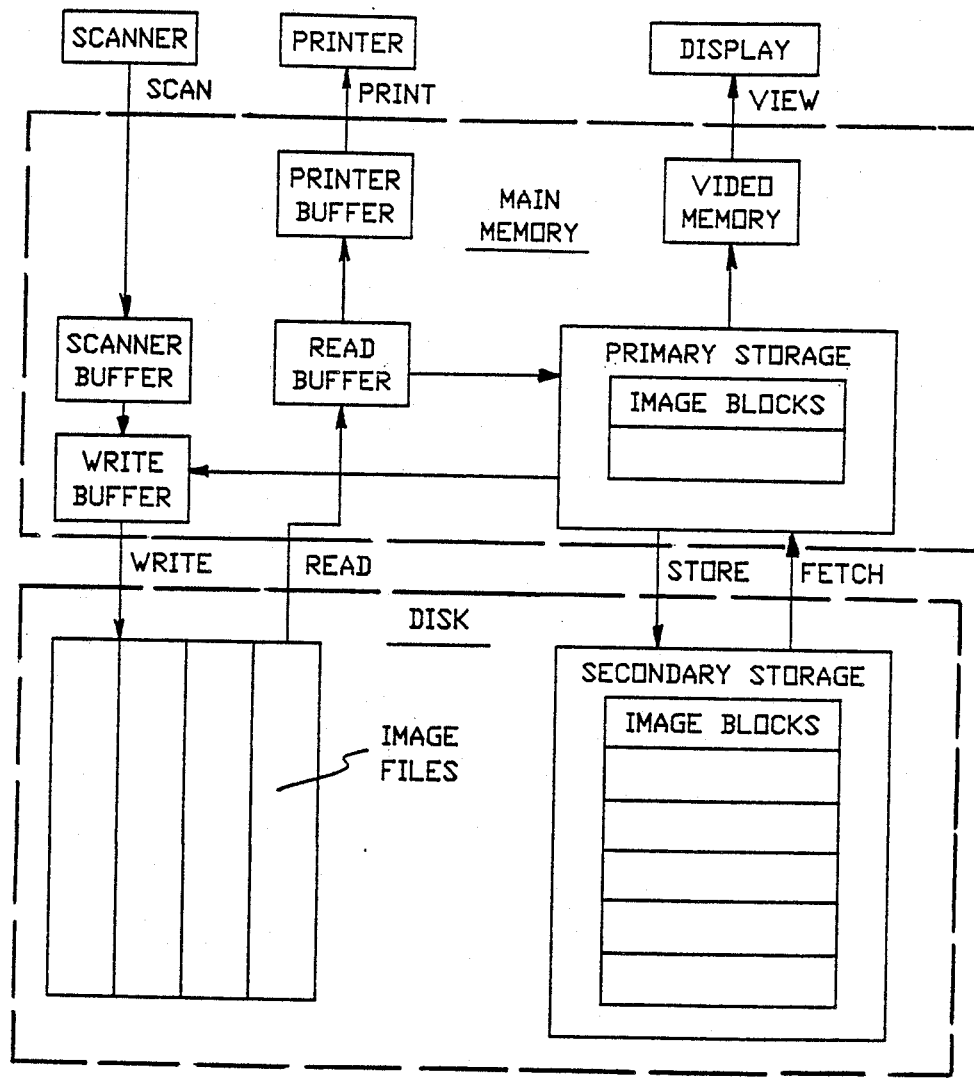
FIG. 1 is a schematic representation of a virtual image system useful in the performance of the present invention.

The invention is part of an image processing system. As shown in FIG. 1, the system consists of a processor with main memory, a disk, a display, a printer, and a scanner. Images are captured by the scanner, filed on the disk, presented on the display and printer, and processed in main memory.

Main memory is normally subdivided into display memory, input/output buffers for the printer, scanner and disk, and blocks for images. The portion of main memory devoted to image blocks will be referred to as primary storage.

The disk is used for long term storage of image files. It is also used as temporary working storage for image processing. During the course of image processing primary storage blocks are moved between main memory and disk. The portion of disk used for image blocks will be referred to as secondary storage.

Images can be read into main memory from the scanner or disk. Images can be written from main memory to the printer or disk. Images can also be moved within main memory, for example, from a buffer to display memory. Since the size of an image is typically very large in comparison to the amount of available main memory, an efficient memory management scheme is needed in order to perform image processing functions.

Functions such as scanning, printing and filing on disk require only sequential access of images. For example, images are scanned from left to right and top to bottom, that is, the image is divided in a sequence of horizontal scan lines. Each scan line is recorded from left to right. When a scan line is completed, the next scan line below it is started. The characteristic feature of sequential access is that each bit of information in the image is processed precisely once and in a definite order.

On the other hand, functions such as viewing and editing require random access in order to be performed efficiently. For example, a display may only be capable of presenting a portion of an image at a given magnification. In order to view the complete image, the user must scroll it. This requires both left/right and up/down movement of the visible portion. Also, editing operations can result in any portion of the image content being modified.

If the image could only be accessed sequentially, then operations that required access to a previously accessed scan line would cause the image to be rewound. That is, the image would have to be reaccessed from its start and processed to the scan line that the view or edit operation required. If the required scan line was near the top of the image, little overhead would be entailed. However, if the required scan line was near the bottom of the document, almost all of the document would have to be processed. On average, half the document would have to be processed for every view or edit operation.

In order to reduce the amount of processing required for view and edit operations, a random access method must be used. The characteristic feature of random access is that portions of the image can be accessed independently. The present invention provides a random access method that permits a class of viewing and editing functions to be performed efficiently in a system that has limited main memory.

The viewing functions for which the invention is particularly useful are magnification and reduction, shape change, color inversion, and orientation change of an image.

Magnification and reduction are necessary for two main reasons. Firstly, the resolutions of the scanner, printer and display may differ. Therefore, in order to view or print an image at actual size it may have to be magnified or reduced. Secondly, it may be useful to magnify or reduce the actual size of the image in a variety of applications, such as editing and page composition. For example, fine editing is done more easily on a magnified view of the image. Also, an image may have to be reduced in order to fit a predefined space on a page.

Shape change is necessary since the aspect ratios of the scanner, printer and display may differ. The aspect ratio must be corrected in order to view the image in correct proportion. For example, if the aspect ratio is not corrected, circles will appear as ellipses.

Color inversion is required in order to correct for different photometric interpretations. For example, a scanner may interpret black as 1 and white as 0, while a display may have the opposite interpretation. Also, certain editing operations may be easier to perform if the color of the image is inverted. This may be due to a combination of display hardware characteristics and human psychology.

Orientation change is required in order to view images whose orientation differs from the display. For example, an image with landscape orientation must be scanned in a rotated orientation in order for the paper to fit in the scanner. In order for it to be viewed in normal orientation its orientation must be rotated. Also, images may be inadvertently scanned upside down. Changing their viewing orientation permits them to be viewed in normal orientation.

The editing operations for which the invention is particularly useful include scaling, orientation change, color inversion, pattern filling, copying, moving, merging, and graphical and textual annotation.

Scaling permits the shape and size of an image to be changed. Orientation change permits the image to be rotated by multiples of ninety degrees and flipped over a vertical or horizontal axis. Color inversion permits black and white to be interchanged. Pattern filling permits an area to be wallpapered with a repeating pattern.

Copying, moving and merging permit a portion of one image to be extracted and combined with either the original image or a second image. In copying, a portion of an image is duplicated, while in moving, the source of the image is erased. In merging, two images are combined using a specified mixing rule. The supported mixing rules are replacement and the logical operations of conjunction, disjunction and exclusion. These permit special effects such as superimposition.

Graphical annotation permits lines, curves, polygons, and closed shapes to be drawn on an image using a pen with a specified width and color. Textual annotation permits text to be placed on the image.

The random access method invented to efficiently perform the above viewing and editing operations is based on the concept of a virtual image. This concept is an extension of the concept of virtual memory that is used in mainframe computer systems such as the IBM System/370 Data Processing System.

A virtual image is a data structure used to represent an image. It consists of a two-dimensional array of rectangular sub-images. The collection of sub-images fit together to form the complete image. Since the image will typically be larger than the amount of available main memory, the virtual image is stored in both primary and secondary storage. The sub-images occupy image blocks which may be in primary or secondary storage.

The image block is the basic unit of storage and is analogous to the concept of memory page used in virtual memory systems. Image blocks are swapped between primary and secondary storage on a demand basis. The swapping process is managed by a set of heuristics which are designed to perform the supported viewing and editing operations in the most efficient manner possible. The heuristics are an extension of a least recently used (LRU) algorithm.

A main technique used by the system is to partition each large image into a two-dimensional array of sub-images. In order to apply an operation to a large image, a set of partial operations is applied to its corresponding array of sub-images. The size of the sub-images is chosen so that individually they may fit into primary storage, although collectively they may not. The system moves the sub-images into and out of primary storage as required by the operation being performed.

The system in which the advantages of the present invention are most useful is a system which includes, as a minimum, primary and secondary storage, a display device and a central processor. The system is provided with a virtual image manager for controlling accesses to memory. The publication "Introduction to Virtual Storage in System/370", SR20-4260-1 published by International Business Machines Corporation describes how such a virtual storage system may be organized. The concepts described therein may be used to organize the memory to handle image information under control of a virtual image manager. The sytem is also provided with a primary storage manager and a secondary storage manager.

The virtual image manager permits the image processing application program to define and process large digital images. The virtual image manager enables the large digital image to be represented as a set of component small images or sub-images which have mutually disjoint domains and which, together, equal the full domain of the large image. This arrangement enables image processing operations to be applied independently to each of the sub-images of the large image in any arbitrary order. This ability to process each sub-image independently of any other sub-image enables fast and efficient processing of images.

The primary storage manager communicates with the virtual image manager and the secondary storage manager. The primary storage manager maintains a region of memory for storing a set of sub-images. The storage region must be large enough to store the minimum number of sub-images which must be simultaneously accessed in order to perform any of the supported operations. For example, in order to copy one large image to another, it is necessary to access two sub-images simultaneously.

The primary storage manager also saves sub-images into secondary storage from primary storage and fetches sub-images from secondary storage to primary storage. The primary storage manager also retains the state information for each sub-image to indicate how recently the sub-image was accessed and whether it has been modified since it was last saved to secondary storage.

In operation, when the virtual image manager receives a request to perform an operation on a large image, the virtual image manager generates a list of the sub-images of the large image that must be accessed. The list is provided to the primary storage manager which then determines the order in which the individual sub-images are to be accessed in accordance with a modified form of the least recently used (LRU) algorithm which will be more fully described hereinafter. As each sub-image is accessed, the required modification to the sub-image is performed and the sub-image identity is removed from the list of sub-images.

The secondary storage manager is responsible for saving sub-images from primary storage and restoring them to primary storage as required. Preferably, the secondary storage manager maintains a region of memory which holds the sub-images in a substantially compressed form. This will be referred to hereinafter as the disk cache.

The operations supported by the system have the property that they are independent of the order in which their corresponding partial operations are applied. If an operation is decomposed into n partial operations, there are $n! = n(n-1)(n-2) \ldots 3 \cdot 2 \cdot 1$ possible orders in which they can be applied. For each order, there is a certain range of processing times.

This range of times depends on the state of the system, and on the memory management algorithm. The order of partial operations dictates the order in which sub-images are processed, which in turn may cause them to be moved into memory. However, if there is no free space in memory, another sub-image must first be moved out. This is determined by a memory management algorithm.

If there is room for m sub-images in primary memory, then each time a sub-image is processed, there will in general be a choice of m possible sub-images to move out. Since this must be done n times to complete the operation, there is a total of $n^m$ distinct sequences of operations. Therefore, there is a total of $N = n^m \cdot n!$ possible ways in which the operation can be executed.

Each possible sequence has a definite processing time associated with it. Therefore, given an operation and the current state of the system, there will be a sequence of actions that minimizes the execution time. However, since N will in general be a very large number, it is not practical to find the sequence that minimizes the time. Instead, a set of heuristics is used. The heuristics are an extension of the Least Recently Used (LRU) algorithm. Although they do not guarantee the minimum time solution, they are a significant improvement over the unmodified LRU algorithm. In particular, thrashing is largely eliminated.

Another main technique used by the system is to defer the application of certain operations until the results are actually needed. In particular, this approach is used for sixteen view state transformations of bilevel images. These transformations consist of geometric transformations induced by the eight symmetries of the square each with an optional black to white color inversion. They form a mathematical group. This means that any view state can be reached from any other view state by applying a suitable transformation.

Each sub-image is allowed to have an independent view state. When the view state of a large image is changed, its sub-images are unaffected until they are required by another operation. When they are moved into memory, the memory manager compares their view state to that of their large image. If they differ, an appropriate transformation is applied at that time, and their view state is updated.

View state transformations are typically used when displaying images. For example, a document may have been scanned upside down. With the above approach, if such a document is rotated by 180° only those sub-images that are actually visible need to be transformed in order to refresh the display. Also, there is no global rearrangement of the sub-images. That is, each sub-image can be transformed locally and independently of the others.

This approach differs from that commonly used in other systems where the large image is partitioned into horizontal strips, and there is no concept of view state of the large image. For example, suppose a square is divided into k horizontal strips, and it is rotated by 90°. Then each horizontal strip of the rotated square depends on all the strips of the unrotated square. This means that each strip must be accessed k times, so the amount of data movement is proportional to $k^2$. On the other hand, if the square is divided into k sub-images and each is rotated independently, the amount of data movement is proportional to k.

For the purposes of understanding, the description is directed to bilevel images, although much of what follows could apply equally to gray and color images.

The set of integers is denoted $$Z = \{\ldots, -2, -1, 0, 1, 2, \ldots\}.$$

For a, b $\epsilon$ Z define the interval $$[a,b] = \{x \epsilon Z | a \leq x \leq b\}.$$

If A and B are set, their cartesian product is denoted $$A \times B = \{(a,b) | a \epsilon A, b \epsilon B\}.$$

Let $Z^2 = Z \times Z = \{(x,y) | x,y \epsilon Z\}$ denote the integer plane. A rectangle is a subset of $Z^2$ that is equal to the product of two intervals. Let Rect denote the set of all rectangles.

$$\text{Rect} = \{[a,b] X [c,d] | a,b,c,d, \epsilon Z\}.$$

Let Bit = {0,1}. An image is a function whose domain is a rectangle and whose codomain is Bit. Let Image denote the set of all images.

$$\text{Image} = \{f \epsilon \text{Map}(R, \text{Bit}) | R \epsilon \text{Rect}\}$$

where Map(A,B) denotes the set of all functions from A to B and a function f $\epsilon$ Map(A,B) has domain A and codomain B.

An image transformation is a function that maps images to images. Let ImgTrans denote the set of all image transformations.

$$\text{ImgTrans} = \text{Map}(\text{Image, Image}).$$

Two types of image transformations are of main concern, and are referred to as local and view state transformations. Local transformations arise frequently in image editing operations. For example, graphical annotation and copying or merging with a given source image are local transformations. On the other hand, operations such as seed fill or spatial filtering are not local. View state transformations arise when the orientation or color of an image is changed.

A local transformation is an image transformation that preserves domains and has the property that the value of the transformed image at a point only depends on the values of the untransformed image and the transformation at that point. If L is a local transformation then for all p $\epsilon$ $Z^2$, there exists $L_p$ $\epsilon$ Map(Bit,Bit) such that for all f $\epsilon$ Image with p $\epsilon$ domain(f), (Lf) (p) = $L_p$(f(p)).

$$\text{LocalTrans} \rightarrow \text{Map}(Z^2, \text{Map}(\text{Bit,Bit})).$$

We will refer to the four elements of Map(Bit,Bit) as follows:

$$\text{Map}(\text{Bit,Bit}) = \{\text{nop, not, zero, one}\},$$

$$\text{nop}(0) = 0, \text{nop}(1) = 1,$$

$$\text{not}(0) = 1, \text{not}(1) = 0,$$

$$\text{zero}(0) = 0, \text{zero}(1) = 0,$$

$$\text{one}(0) = 1, \text{one}(1) = 1.$$

The support of a local transformation L is the set of all points where it differs from nop, $$\text{support}(L) = \{p \epsilon Z^2 | L_p \neq \text{nop}\}.$$

Linear transformations of the integer plane that consist of scalings and translations define image transformations as follows. Let Q denote the set of rational numbers. For q $\epsilon$ Q let [q] denote the largest integer that does not exceed q.

$$[q] = \max n.$$

$$q \geq n \epsilon Z$$

For a,b,c,d, $\epsilon$ Q, a,c, > 0, define T $\epsilon$ Map($Z^2$, $Z^2$) by T(x,y) = ([ax+b], [cy+d]).

For X a subset of $Z^2$, define $T^{-1}(X) = \{p \epsilon Z^2 | T(p) \epsilon X\}$. T is a linear transformation that combines scaling and translation. Let LinearTrans denote the set of all such linear transformations.

For T $\epsilon$ LinearTrans, f $\epsilon$ Image define scale (T) (f) $\epsilon$ Image by $$\text{scale}(T) (f) (p) = F(T(p)), p \epsilon T^{-1}(\text{domain}(f)).$$

Clipping by rectangles define image transformations as follows. For r $\epsilon$ Rect, f $\epsilon$ Image define clip(r) (f) $\epsilon$ Image by $$\text{clip}(r) (f) (p) = f(p), p \epsilon r \cap \text{domain}(f)$$

An image can be merged into another image using a mixing function. This defines local image transformations as follows: For m $\epsilon$ Map(Bit X Bit,Bit), f,g $\epsilon$ Image, define mix(m,f) (g) $\epsilon$ Image by $$\text{mix}(m,f)(g)(p) = \begin{cases} m(f(p),g(p)) & \text{if } p \in \text{domain}(g) \cap \text{domain}(f), \\ g(p) & \text{if } p \in \text{domain}(g) - \text{domain}(f). \end{cases}$$

The general copy function is composed of a combination of scaling, clipping, and mixing. For T ∈ LinearTrans, r ∈ Rect, m ∈ MixFunction, and f ∈ Image, the copy transformation is defined as follows.

copy(m,r,T,f) = mix(m,clip(r) (scale(T) (f))).

copy (m,r,T,f) defines a local transformation. Let CopyFunction denote the set of all operations c ∈ Map(Image X Image,Image) that are of the form c(f,g) = copy(m,r,T,f) (g).

There are sixteen view state transformations. They consist of arbitrary combinations of rotations by right angles, vertical and horizontal reflections and color inversions. The basic view state transformations are Invert, Rotate, and Flip, and are defined as follows. Let g be an image with domain [a,b] X [c,d]. Define the geometric transformations rotate, flip ∈ Map($Z^2,Z^2$) by, rotate(x,y) = (−y,x), flip(x,y) = (x,−y).

Then the view state transformations are,

Invert(g) (p) = not(g(p)), p∈[a,b] X [c,d],

Rotate(g) (p) = g(rotate$^{-1}$(p)), p∈[−d,−c] X [a,b],

Flip(g) (p) = g(flip$^{-1}$(p)), p∈[a,b] X [−d,−c].

The view state transformation Invert is also a local transformation,

Invert$_p$ = not, for all p∈$Z^2$.

Let *I* denote the identity transformation, for all f ∈ Image, I(f) = f. The basic view state transformations satisfy the following relations:

Invert$^2$ = Rotate$^4$ = Flip$^2$ = I,

Rotate·Invert = Invert·Rotate,

Flip·Invert = Invert·Flip,

Flip·Rotate = Rotate$^3$·Flip.

Using the above relations, any combination of the basic view state transformation can be reduced to one of the following sixteen:

ViewTrans = {Invert$^a$·Rotate$^b$·Flip$^c$ | 0≦a<2, 0≦b<4, 0≦c<2}.

A view state transformation v can also be expressed in the form v(f) = m·f·g$^{-1}$, m = not$^a$, g = rotate$^b$·flip$^c$, for all f ∈ Image.

We denote this by writing v ≃ (m,g).

Virtual images will be described as an abstract data type. A data model and a set of operations defined in terms of it are described. The design consists of a representation of the data model and an implementation of the operations in terms of the representation.

A virtual image is a restricted form of image. The data models are conceptually the same, but only a subset of image operations can be performed on virtual images. Restricting the set of operations makes it possible to design a data representation in which the operations can be implemented efficiently.

The virtual image data type is modelled on the image data type.

*: VirtualImage → Image f → f*.

When a virtual image is allocated its initial value is set to be the empty image, that is, the image whose domain is the empty set.

The main restriction on virtual image operations is that only the view state and local transformations can be used to update virtual images. The locality restriction is imposed so that when transformations and functions are computed, the data elements of the virtual image can be processed independently and in an arbitrary order.

Any virtual image can be set to equal an image with a given domain and filled with zeroes. For r ∈ Rect, define zero$_r$ ∈ Image by zero$_r$(p) = 0, for all p ∈ r. For v ∈ VirtualImage, define Clear(r,v): v → v', v'* = zero$_r$.

Any view state transformation can be applied to a virtual image. For t ∈ ViewTrans, v ∈ VirtualImage, define ViewTransform(t,v): v → v', v'* = t(v*).

Any local transformation can be applied to a virtual image. For t ∈ LocalTrans, v ∈ VirtualImage, define LocalTransform(t,v): v → v', v'* = t(v*).

Part of a virtual image can be copied to another virtual image. For c ∈ CopyFunction, v ∈ VirtualImage, w ∈ Image, define ExternalCopy(c,v,w): w → w', w' = c(v*,w).

Part of a virtual image can be copied to another virtual image. For c ∈ CopyFunction, v,w ∈ VirtualImage, define InternalCopy (c,v,w): w → w', w'* = c(v*,w*).

In order to implement the preceding virtual image operations, each image is represented as an array of sub-images. Moreover, in order to make the most efficient use of available memory, it is necessary to consider the set of virtual images as a unit, rather than individually. It is assumed that there is a limited quantity of primary storage where operations can be performed on the sub-images, and an unlimited quantity of secondary storage where sub-images can be stored and fetched. During the course of an operation on one virtual image, the contents of primary and secondary storage will change, thus affecting the state of the variables that represent all virtual images.

Let A and B be sets. Let Table(A,B) be the set of all functions with domain X a subset of A and codomain B.

$$\text{Table}(A,B) = \{\text{Map}(X,B) | X \text{ a subset of } A\}.$$

Virtual images will be represented as entries in a virtual image table $\alpha$ Table(Z,VirtualImage). The table $\alpha$ will be treated as a state variable that is accessed only by operations on the VirtualImage data type.

A virtual image $f = (d,v,e,t,s) \in$ VirtualImage consists of the following components:
1. A domain rectangle $d \in$ Rect.
2. A view state $v \in$ ViewTrans.
3. An elementary rectangle $e \in$ Rect.
4. A primary storage table $t \in$ Table(Z,PrimaryBlock).
5. A secondary storage table $s \in$ Table(Z,SecondaryBlock).

The domain rectangle defines the domain of the virtual image. The view state represents the cumulative affect of all view state transformations that have been applied to the virtual image. These transformations are not applied to its sub-images until they are accessed. The elementary rectangle defines how the virtual image is partitioned into sub-images. The primary and secondary storage tables contain the sub-images that are in primary and secondary storage respectively. This data structure is illustrated in FIG. 2.

Figure 2A:
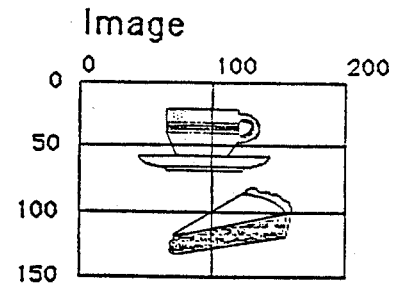
FIG. 2a is a schematic representation of an image to be stored and displayed.

As shown in FIG. 2a the image is represented by a pel or pixel size which is 200 pixels wide by 150 pixels high. In this example, the image is subdivided into six sub-images, each of which is 100 pixels wide and 50 pixels high. The six sub-images are defined as ij=00 through 12.

Figure 2B:
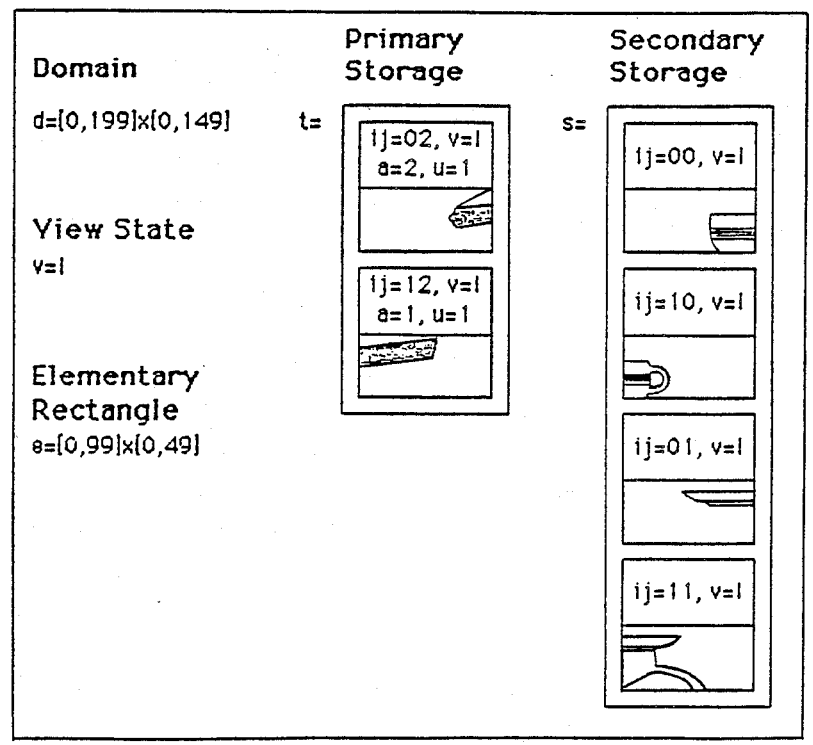
FIG. 2b is a schematic representation of the manner in which the image shown in FIG. 2a may be stored.

In the representation shown in FIG. 2b, sub-images 02 and 12 have been stored in primary storage and sub-images 00, 10, 01 and 11 are stored in secondary storage. In the normal operation of the processing system, a copy of sub-images 02 and 12 would also exist in secondary storage although the sub-images stored in secondary storage may differ from the corresponding sub-images stored in primary storage if any alteration has been performed on the image during processing.

A table is associated with each image and sub-image. As indicated in FIG. 2b, the table for the image and each sub-image shown illustrates a view state of I meaning that all image information is currently stored in the same view state. The table for sub-image 02 indicates an access value of a=2 and a change value of u=1. This indicates that sub-image 02 was accessed less recently than sub-image 12 and, therefore, would be restored to secondary storage before sub-image 12 if all other indicators were equal. As the change value u=1 for both sub-images, it would be necessary to restore the sub-images to secondary storage if a copy already existed there since the sub-images have been altered.

Let $e = [x_1, x_2] \times [y_1, y_2]$. Its width is $w = x_2 - x_1 + 1$ and its height is $h = y_2 - y_1 + 1$. The integer plane can be tiled by translating e by multiples of the displacement vector (w,h). For $(i,j) \in Z$, define $$e_{ij} = [x_1 + iw, x_2 + iw] \times [y_1 + jh, y_2 + jh].$$

These rectangles are mutually disjoint and cover the entire integer plane. For $p \in Z$, define $$\text{block }(e,p) = (i,j) \text{ if } p \in e_{ij}.$$

A primary storage block $b = (f,v,a,u) \in$ PrimaryBlock consists of the following components:
1. An image $f \in$ Image.
2. A view state $v \in$ ViewTrans.
3. An access count $a \in Z$.
4. An update flag $u \in$ Bit.

The image is a sub-image of a virtual image. The view state is the cumulative affect of all view state transformations that have been applied to the image.

The access count of each primary storage block is used to determine how recently it has been accessed. The access count is either zero or positive. If it is zero, the block is said to be accessed and will not be swapped out to secondary storage. If it is positive, the block is said to be released, and may be swapped out. The greater the access count, the less recently the block has been accessed. Whenever a block is accessed, its access count is reset to zero, and the access counts of all released blocks are incremented by one.

The update flag indicates whether the block has been modified. It is also used to control swapping.

In practice, primary storage blocks are allocated in main memory.

A secondary storage block $b = (f,v) \in$ SecondaryBlock consists of the following components:
1. An image $f \in$ Image.
2. A view state $v \in$ ViewTrans.

The image is a sub-image of a virtual image. The view state is the cumulative effect of all view state transformations that have been applied to the image.

Although it is possible to allocate secondary storage blocks directly on disk, a more complex design is preferred. Since processing image information involves very large quantities of data, a two part secondary storage scheme is preferred. In order to store a primary storage block to secondary storage, it is first compressed and moved to a disk cache. When the disk cache gets full, the least recently used block is written to disk. In order to fetch a secondary storage block, it is first moved to the disk cache, if necessary, and then decompressed into primary storage. This works well for images such as scanned text that have a high compression ratio. It is not so advantageous when used on scanned photographic images because they have a much lower compression ratio. In this case the use of compression reduces system performance.

Let $k \in$ domain $(\alpha)$ be the index of a virtual image and let $\alpha(k) = f = (d,v,e,t,s)$. Let the view state $v \simeq (m,g)$. The domain of f is d which is partitioned into sub-images defined by the elementary rectangles $g(e_{ij})$. These sub-images are contained in the primary and secondary tables, but they each possess an independent view state. The domains of these images must agree with those defined by the elementary rectangle. For the primary storage table we have for all $(i,j) \in$ domain(t) with $t(i,j) = (f_{ij}, v_{ij}, a_{ij}, u_{ij})$, $$\text{domain }(v_{ij}^{-1}(f_{ij})) + g^{-1}(d) \cap e_{ij}.$$

Similarly, for the secondary storage table we have, for all $(i,j) \in \text{domain}(s)$ with $s(i,j) = (f_{ij}, v_{ij})$, domain $(v_{ij}^{-1}(f_{ij})) = g^{-1}(d) \cap e_{ij}$.

These constraints state that the domains of the sub-images line up with the elementary rectangle when all view state transformations are undone.

We assume that the sub-images stored in primary and secondary storage are limited in size. Let MaxArea $\in Z$ denote the maximum area of the sub-images. The areas of the elementary rectangles must not exceed this value. In a practical embodiment, a value of $131072 = 8 \times 16384$ may be used. This means that the sub-images occupy 16 kilobytes of storage.

There is a limited quantity of primary storage available. Let MaxBlocks $\in Z$ denote the maximum number of primary storage blocks available. In practice, this value is determined at run time and depends on the amount of memory allocated to the program. This value must be at least 2 in order to perform the InternalCopy operation, and at least 1 for the other operations. The primary storage blocks are shared between all virtual images. The total number of all primary storage blocks allocated to all virtual images must not exceed MaxBlocks.

Image operations can only be applied to sub-images in primary storage. Since primary storage is limited, sub-images are swapped between primary and secondary storage on a demand basis. Therefore, system performance depends on the amount of available primary storage. In order to minimize swapping, a set of heuristics is used. These are derived from a LRU algorithm.

A virtual image $f = (d,v,e,t,s)$ with $v \simeq (m,g)$ defines a derived image $f^*$ as follows:
1. domain $(f^*) = d$
2. for all $p \in d$ with block $(e, g^{-1}(p)) = (i,j)$,
   (a) if $(i,j) \in$ domain $(t)$ with $t(i,j) = (f_1, v_1, a_1, u_1)$ then $f^*(p) = v(v_1^{-1}(f_1))(p)$,
   (b) else if $(i,j) \in$ domain$(s)$ with $s(i,j) = (f_2, v_2)$ then $f^*(p) = v(v_2^{-1}(f_2))(p)$,
   (c) else $f^*(p) = m(0)$.

This definition states that to compute the value of the image at a point, first determine within which sub-image it lies. If its sub-image is in primary storage, use the value it defines. If its sub-image is in secondary storage use its value. If its sub-image is neither in primary nor secondary storage use the value 0. Also, the values must be adjusted by a view state transformation to make the sub-image agree with the virtual image. To actually access the value, sub-images may have to be swapped between primary and secondary storage.

It should be noted here that many different states of a virtual image variable map to the same image. First, each sub-image may be swapped between primary and secondary storage without changing the derived image. Second, each sub-image may be given an arbitrary view state without affecting the derived image.

Using the above mapping, a newly declared virtual image may be set to the empty image and initialized to $(\emptyset, I, \emptyset, \emptyset, \emptyset)$.

The programming interface of the virtual image operations uses an index into the virtual image table $\alpha$ in order to identify a virtual image. $\alpha$ is part of the state data of the virtual image data type. It is treated as a global variable that can only be accessed by the virtual image operations. It is not explicitly passed as an argument to the operations but is affected by all of them.

The value of $\alpha$ after the operation will be denoted $\alpha'$. The data flow for these operations is illustrated in FIG. 3.

Figure 3:
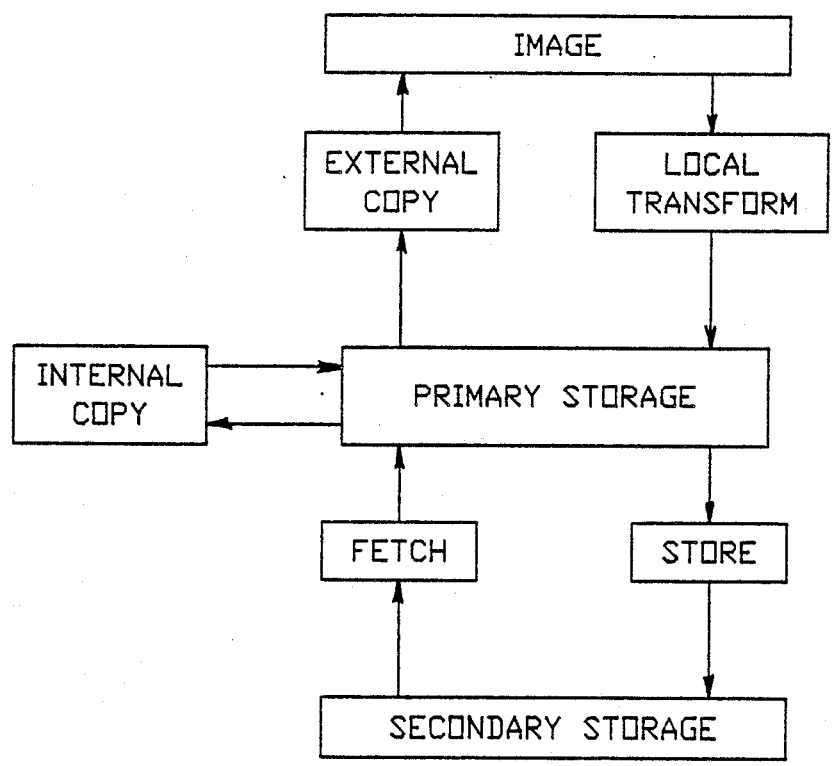
FIG. 3 is a system data flow diagram.

As shown in FIG. 3, the portion of the image being processed must be available in primary storage. The fetch and store operations enable sub-images to be transferred between secondary storage and primary storage for processing.

For $r \in \text{Rect}$, $k \in \text{domain}(\alpha)$, Clear $(r,k)$: $\alpha \rightarrow \alpha'$ $\alpha'(k)^* = \text{zero}_r$.

Let $\alpha(k) = (d,v,e,t,s)$. The operation Clear $(r,k)$ is performed as follows:
1. Delete all primary storage blocks in t.
2. Delete all secondary storage blocks in s.
3. Set the virtual image table entry to $(r, I, \text{Element}(r), \emptyset, \emptyset)$.

$\alpha'(k) = (r, I, \text{Element}(r), \emptyset, \emptyset)$.

Clearly, the domain of the derived image is r. Also, since the view state is I and there are no sub-images in primary or secondary storage, the value of the derived image is 0 throughout its domain.

Note that the operation of setting the primary and secondary storage tables to be empty frees the storage occupied by the blocks they contained.

In the above description we have introduced the Element function. This function computes an appropriate elementary rectangle for a given domain. We assume this function is given. Different choices for this function will lead to different system performance characteristics. Its selection should be based on the expected statistical distribution of image operations. In practice, we use a function appropriate for viewing unrotated images on a display screen whose width is greater than its height. The elementary rectangle is chosen so that its width is 2 to 3 times greater than its height and its area is close to MaxArea. The actual width is selected to minimize wasted space when covering the domain.

For $w \in \text{ViewTrans}$, $k \in \text{domain}(\alpha)$ ViewTransform $(w,f)$ is ViewTransform $(w,k): \alpha \rightarrow \alpha'$, $\alpha'(k)^* = w(\alpha(k)^*)$.

Let $w \simeq (m,g)$, and $\alpha(k) = (d,v,e,t,s)$. The operation ViewTransform $(w,k)$ is performed as follows:
1. Set the virtual image table entry to $\alpha'(k) = (g(d), w.v, e, t, s)$.

Only the domain and view state of the transformed virtual image are modified. There is no immediate effect on primary or secondary storage. The actual view state transformation is only applied to the sub-images in primary storage when they are accessed. In this case, a suitable view state transformation is applied to the sub-image to make its view state agree with that of the virtual image.

For $L \in \text{LocalTrans}$, and $k \in \text{domain}(\alpha)$

LocalTransform $(L,k): \alpha \rightarrow \alpha'$, $\alpha'(k)^* = L(\alpha(k)^*)$.

Let $\alpha(k) = f = (d,v,e,t,s)$ and $v \simeq (m,g)$. The operation LocalTransform $(L,k)$ is performed as follows:
1. Compute the set S of all sub-images of f that are affected by L.

$S = \{(i,j) \mid \text{domain}(f) \cap \text{Support}(L) \cap g(e_{ij}) \neq \emptyset\}.$ 2. While the set S is non-empty:
   (a) Find the sub-image (i,j) ∈ S that can be fetched at least cost.
   (b) Fetch it into primary storage. Let $t(i,j) = (f_{ij}, v_{ij}, a_{ij}, u_{ij})$.
       Note that the fetch operation results in the view state of the sub-image agreeing with that of the virtual image.

$v_{ij} = v.$ (c) Access it for writing.
       i. Set its update flag to 1.

$u_{ij} \rightarrow 1.$ ii. Set its access count to 0.

$a_{ij} \rightarrow 0.$ iii. Increment the access counts of all released primary storage blocks.
           for all k' ∈ domain(α), $\alpha(k') = (d', v', e', t', s'),$ For all (i',j') ∈ domain(t'), t' (i', j') = (f'',v'',a'',u''), if $a'' \leq 0$ then $a'' \rightarrow a'' + 1$
   (d) Apply L to it.

$f_{ij} \rightarrow L(f_{ij}).$

Since L is local it can be applied independently to each sub-image of the virtual image.
   (e) Release it.
       i. Set its access count to 1.

$a_{ij} \rightarrow 1$ (f) Delete it from the set S.

$S \rightarrow S - \{(i,j)\}.$

To find the sub-image in S with the least fetch cost, use the following criteria:
1. Sub-images in primary storage that have their update flag set are least costly to access. This rule saves processing in the case that a primary storage block has to be swapped to secondary storage as a side effect of accessing another image. If updated blocks are accessed first, those that have not been updated can be swapped out more cheaply since there is no need to refresh their copies in secondary storage.
2. Sub-images in primary storage that have their update flag clear are selected as being the next least costly.
3. Sub-images that are not in primary storage, but are in secondary storage are considered the next least costly.
4. Sub-images that are neither in primary nor secondary storage are considered the most expensive to fetch. To fetch a sub-image into primary storage, the following operations are undertaken.
1. If the sub-image is not in primary storage:

(a) If the number of allocated primary storage blocks is equal to Maxblocks:
       i. Find the primary storage block with the least expensive store cost.
       ii. Store it in secondary storage.
   (b) Allocate a primary storage block for the sub-image.

Let $t(i,j) = (f_1, v_1, a_1, u_1).$ (c) Set the access count to 1.

$a_1 \rightarrow 1.$ (d) Set the update flag to 0.

$u_1 \rightarrow 0.$ (e) If the sub-image is in secondary storage:
       i. Then copy the sub-image and view state from secondary storage to primary storage. Let $s(i,j) = (f_2, v_2).$ $f_1 \rightarrow f_2,$ $v_1 \rightarrow v_2.$ ii. Otherwise create a blank sub-image in the same view state as the virtual image. Let $r = g^{-1}(d) \cap e_{ij}.$ $f_1 \rightarrow v(\text{zero}_r),$ $v_1 \rightarrow v.$ 2. If the view state of the sub-image differs from the virtual image, $v_1 \neq v$:
   (a) Transform the sub-image to agree with the virtual image.

$f_1 \rightarrow v(v_1^{-1}(f_1)) = (v \cdot v_1^{-1})(f_1).$ (b) Update the view state.

$v_1 \rightarrow v.$

To store a primary storage block, $t(i,j) = (f_1, v_1, a_1, u_1)$, in secondary storage, do the following:
1. If the update flag has been set, $u_1 = 1$, or the sub-image in secondary storage, $s(i,j) = (f_2, v_2)$, has a different view state, $v_1 \neq v_2$,
   (a) Then allocate the secondary storage block if it does not already exist and copy the view state and sub-image to secondary storage.

$f_2 \rightarrow f_1,$ $v_2 \rightarrow v_1.$

2. Delete the block from primary storage.
To find the least costly primary storage block to store, the blocks may be sorted according to the following criteria:
1. The primary criterion is whether the block contains a sub-image in set S. Sub-images not in S are less costly to swap out than those in S. It is more expensive to swap out a sub-image in S because we know that we will eventually have to swap it in again in order to complete the operation.

2. The second criterion is whether the block has been updated. It is more expensive to swap out an updated block because we will have to update secondary storage. If the block has not been updated, there is no need to update secondary storage. However this rule would lead to updated blocks accumulating in primary storage. To prevent this a value MaxCount $\epsilon$ Z is chosen. If the access count exceeds this value, the block should be stored in preference to blocks that have not been updated. For example, the user may edit a region then view its neighborhood. Initially the edited blocks will be retained in primary storage. Eventually their access counts will exceed MaxCount and they will be stored to secondary storage, leaving more primary storage blocks available for viewing neighboring sub-images. If MaxBlocks is small then this criterion should be overridden by setting MaxCount to zero.

3. The third criterion is the access count. It is more expensive to swap out a block with a low access count because we are more likely to access it again in the future. This is the basis of the LRU algorithm. This is actually the least significant factor. For example, a user may be editing a small area of an image. The sub-images that are affected by the editing operations should be kept in primary storage in preference to those that are not affected. Since multiple editing operations are likely to affect the small localized set of sub-images, this heuristic improves performance. Note that blocks with an access count of 0 are not eligible to be swapped out since they are in use.

For c $\epsilon$ Copy-function, k $\epsilon$ domain ($\alpha$), and f $\epsilon$ Image $$\text{ExternalCopy (c,k,f): } \alpha \rightarrow \alpha', f \rightarrow f',$$

$$f' = c(\alpha(k)^*, f).$$

The ExternalCopy operation is similar to the local transform operation. The main difference is that the set R is computed as the set of all sub-images that must be accessed to update the destination image. Also, the sub-images are accessed for reading so their update flags are not set.

Let $\alpha(k) = (d,v,e,t,s)$, $v \simeq (m,g)$ and $c(h,f) = $ copy $(n,r,T,h,f)$. The operation ExternalCopy (c,k,f) is performed as follows:

1. Compute the region W of f that is updated by the operation.

$$W = \text{domain}(f) \cap r \cap T^{-1}(d).$$

2. Compute the set R of all sub-images of $\alpha(k)$ that are required to update f.

$$R = \{(i,j) | W \cap T^{-1}(g(e_{ij})) \neq \emptyset\}.$$

3. While R is non-empty:
   (a) Find the sub-image (i,j) $\epsilon$ R with the least fetch cost.
   (b) Fetch it into primary storage. Let $$t(i,j) = (f_{ij}, v_{ij}, a_{ij}, u_{ij}).$$

Note that the fetch operation results in the view state of the sub-image agreeing with that of the virtual image.

$$v_{ij} = v.$$

(c) Access it for reading.
   i. Set its access count to 0.

$$a_{ij} \rightarrow 0.$$

ii. Increment the access counts of all released primary storage blocks.
   for all k' $\epsilon$ domain($\alpha$), $\alpha(k') = (d',v',e',t',s')$, for all (i',j') $\epsilon$ domain(t'), $t'(i',j') = (f'',v'',a'',u'')$, if $a'' > 0$ then $a'' \rightarrow a'' + 1$.

(d) copy from the sub-image.

$$f \rightarrow c(f_{ij}, f).$$

Since the value of the updated destination image at each point only depends on a single point in the source image, the copy operation can be computed by independently accessing sub-images of the source virtual image and copying their values to the destination image.

(e) Release it.
   i. Set its access count to 1.

$$a_{ij} \rightarrow 1.$$

(f) Delete it from R.

$$R \rightarrow R - \{(i,j)\}.$$

For c $\epsilon$ CopyFunction, and k,l $\epsilon$ domain($\alpha$) with k $\neq$ l, $$\text{InternalCopy (c,k,l)}: \alpha \rightarrow \alpha'$$

$$\alpha'(l)^* = c(\alpha(k)^*, \alpha(l)^*).$$

The InternalCopy operation is a combination of the local transformation and the ExternalCopy operations. This is because the operation of copying a given source image onto a destination image is a local transformation of the destination image.

The most efficient way to perform this operation is to access each affected sub-image of the destination virtual image only once. Otherwise, if the sub-images of the source virtual image were accessed only once, each would in general partially update several destination sub-images. This would cause secondary storage to be updated more than necessary in the case that the partially updated sub-images had to be stored in order to access additional source sub-images.

Most of the details of this operation are the same as above and will not be repeated here. The only different feature is that the criteria for computing the sub-image with the least store cost includes both S and R. Sub-images in S are less costly to store than those in R because they will not be accessed until all sub-images in R have been.

1. Compute the set S of all sub-images of the destination virtual image that will be updated.
2. While S is non-empty:
   (a) Compute the sub-image in S with the least fetch cost.
   (b) Compute the set R of all sub-images in the source virtual image that are required to update the selected destination sub-image.
   (c) Fetch the selected destination sub-image.
   (d) Access it for writing.

(e) While R is non-empty:
  i. Compute the sub-image in R with the least fetch cost.
  ii. Fetch it.
  iii. Access it for reading.
  iv. Partially update the accessed destination sub-image by copying the accessed source sub-image to it.
  v. Release the source sub-image.
  vi. Delete it from R.
(f) Release the accessed destination sub-image.
(g) Delete it from S.

To more readily understand the principles of the present invention, a few examples are described hereinafter.

Figures 4A, 4B:
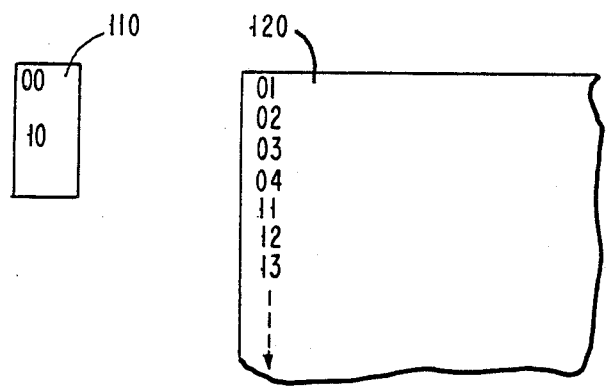
FIGS. 4a and 4b are schematic diagrams used to illustrate an example of the image handling characteristics of the invention.

As shown in FIG. 4a, an image of a tree is shown schematically on an image field which is subdivided into forty-five rectangular sub-images 00 to 44. The figure illustrates how the image would be displayed if the entire image was to be projected on a display screen.

Each portion of the image is identified by sub-image 00, 01, 02, . . . 43, 44.

When the image is initially scanned it is loaded into the primary store 110 and transferred to the secondary store 120 in sub-image segments as primary store 110 is filled.

In the illustrated example, the primary storage 110 is shown as capable of holding two sub-images. The remaining sub-images are stored in the secondary storage 120 which must be sufficiently large to hold all the image information. This can be achieved at less memory cost by compressing the image information. A satisfactory approach for compressing image data in storage is provided in the CCITT Group 3 Facsimile Machine standard available from that organization. Any suitable data compression technique could be used, and such techniques are well known to those skilled in the art and will not be further described herein as they are not part of the present invention. However, if the compression approach described in the CCITT Group 3 standard is used, then the compression of image information can vary widely from one sub-image to another depending upon how much the display information varies over the sub-image area. For example, areas 12, 33 and 44, etc., would require very little compressed storage space because the sub-image is unchanged over the entire sub-image area whereas, sub-images 11, 13 and 32, etc., may require substantially more storage space in their compressed state because of variations within each sub-image.

In the example, sub-images 00 and 01 are situated in primary storage and the remainder stored in secondary storage.

If, for example, one desired to view a portion of the image, say the portion in the area within sub-images 10, 11, 20 and 21, the most efficient or least costly method of accessing those sub-images would be followed.

First, an access list would be generated. In this example, the access list equals {10, 11, 20, 21}.

The primary storage 110 is then examined to determine whether any of the required sub-images are available. The sub-image 10 is stored in the primary storage 110. Sub-image 10 is then copied to the display screen and deleted from the access list.

As no other sub-images on the access list are available in primary storage 110, they must be retrieved from secondary storage 120. However, as primary storage 110 is full, space must be made available by transferring a sub-image from primary storage 110 to secondary storage. In this simple example, sub-image 00 would be transferred to secondary storage as it has not been accessed and is not on the access list. Of course, if sub-image 00 was previously stored and retrieved from secondary storage and has not been changed since it was retrieved, it would not be necessary to perform the store operation as sub-image 00 would still be in the secondary store. In that case, a new sub-image could be written over sub-image 00 in the primary store.

As each of sub-images 11, 20 and 21 must be retrieved from secondary store and there are no other indications as to which is more useful or easier to access, they may simply be accessed in sequence. However, each time one is accessed, one of the sub-images in the primary store 110 must be returned to the secondary store 120. In the present example, sub-image 11 would replace sub-image 00 in the primary store 110. Next, sub-image 10 would be returned to secondary storage 120 and replaced in primary storage 110 by sub-image 20. Sub-images 11 and 20 would be furnished to a display generator (not shown). Sub-image 11 would be returned to secondary storage 120 and replaced in primary storage 120 by sub-image 21 which would also be provided to the display generator. In this manner, the four sub-images 10, 11, 20 and 21 are accessed and displayed.

The displayed sub-images can then be altered at the display.

Of course, to maintain control of the images, it is necessary to provide a status table for each image and sub-image. The image status table identifies the orientation and color state of the image by bit indicators. Each sub-image table maintains a record of its individual orientation and color. Whenever a sub-image is to be provided to the display generator for display as a viewed image, a comparison is made between the viewed image orientation and color states and the sub-image orientation and color states. If the comparison fails, the sub-image orientation and/or color states are changed to conform to those of the viewed image. In this way, the orientation and/or color state of each sub-image is only changed if it is required for display when its states do not conform with the viewed image. With this control arrangement, individual sub-images of a viewed image may be in several different states in primary and secondary storage but would be displayed in the correct state when required.

An example of a main image and a sub-image status table is shown in FIG. 2.

For example, if one wished to rotate part of image shown within the sub-image set {10, 11, 20, 21, 30, 31} it would not be necessary to rotate other sub-images.

In our example, the sub-images 20 and 21 were retained in primary storage after the previous access operation. As both of these sub-images are on our access list for the rotate function, these will be accessed and rotated first. The sub-image tables are updated. After both have been so accessed, another sub-image is sought. As all remaining sub-images are in the same states initially, each of the remaining sub-images would be accessed in any order. For sake of simplicity, assume they are accessed in the order 10, 11, 30 and 31. When the access and rotate operation is complete, the primary storage 110 will retain sub-images 30 and 31 and the sub-image tables will indicate that sub-images 10, 11, 20, 21, 30 and 31 are stored in the rotated state. The remaining sub-images are stored in the original state, and the main image register indicates that the image is in a rotated state.

Other functions such as reflecting, inverting, scaling and copying of the image would be processed in a like manner.

In order to illustrate the improved operation of my virtual image system, and to compare it with a general purpose virtual memory system, a further simple example will be described in detail. The example will consist of reading an image into memory and then graphically annotating it first, with a circle drawn about its center and second, with a rectangle also drawn about its center.

Figure 5A:
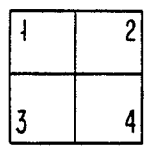
FIGS. 5a and 5b are schematic representations of the steps of processing an image which is useful in showing the advantages of the invention.
Figure 5A:
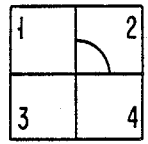
Figure 5A:
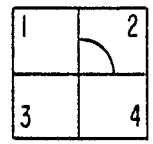
Figure 5A:
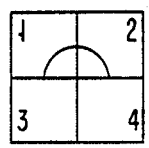
Figure 5A:
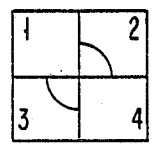
Figure 5A:
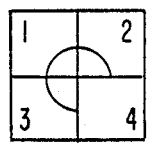
Figure 5A:
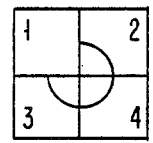
Figure 5A:
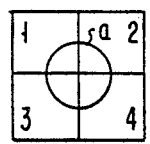
Figure 5A:
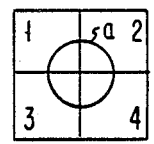
Figure 5B:
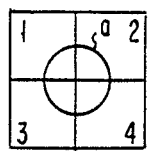
Figure 5B:
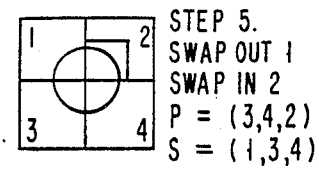
Figure 5B:
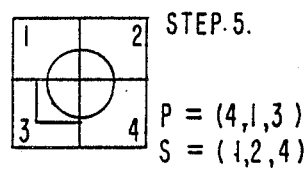
Figure 5B:
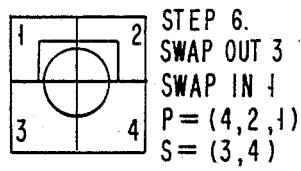
Figure 5B:
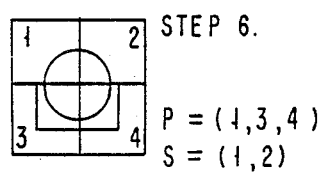
Figure 5B:
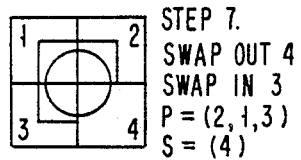
Figure 5B:
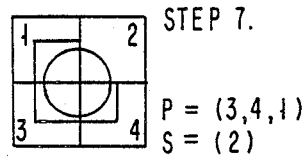
Figure 5B:
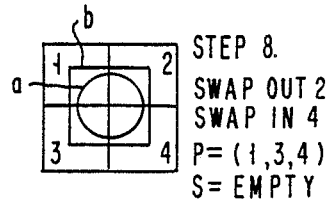
Figure 5B:
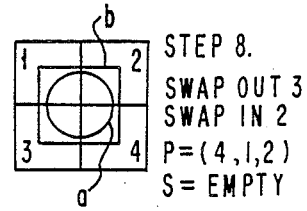

The simple image example is shown in FIGS. 5a and 5b. As illustrated in FIGS. 5a and 5b, the image is subdivided into four sub-image areas and for purposes of illustration two modifications are to be performed to the image area. First circle a is to be drawn in the image field and then rectangle b.

For illustrative purposes, let us assume that the primary storage area can store three sub-images and that the image is divided into a two by two array of sub-image blocks. Also assume that the sub-images labelled 2, 3 and 4 in FIGS. 5a and 5b were originally retained in primary storage and sub-image 1 was stored in secondary storage during an earlier image read operation.

Since primary storage is only capable of holding three sub-image blocks, its state may be represented by a list of three sub-image blocks. The order of block numbers in the list will be from least to most recently used. In the present example, if the sub-images are read from left to right and top to bottom, the original image read operation results in primary storage being in the state (2, 3, 4). Sub-image 1 is in secondary store.

Now, let us consider graphically annotating the image with circle a and rectangle b. To do this requires that all four sub-image blocks be modified. First, we will describe how this would be achieved with a general virtual memory system using a least recently used (LRU) algorithm and then describe how the system is improved by using my modified algorithm.

In a general virtual memory system, the difference between primary and secondary storage is transparent to the operation being performed. During the course of the operation data is swapped between primary and secondary storage on a demand basis. The LRU algorithm is used to decide which memory page or in the present instance, sub-image block, should be swapped out to secondary storage in order to make room for the demanded page or sub-image block.

If we assume the circle a is drawn in a counter-clockwise direction starting at angle zero, the sub-image blocks will be accessed in the order 2, 1, 3, 4.

If a normal LRU operation were to be performed, the following steps would be necessary to add the circle a and rectangle b to the image area:

Step 1
(a) store portion of a in sub-image 2 which is in primary store;
(b) update access status of 2 to most recently accessed, primary storage is now in access order (3, 4, 2);
Step 2
(a) swap out sub-image 3 and swap in sub-image 1 into primary store so that sub-image 1 can be updated next;
(b) store portion of a in sub-image 1;
(c) update access status of 1 to most recently accessed and 2 to next most recently accessed and 4 to least most recently accessed (4, 2, 1);

Step 3
(a) swap out sub-image 4 and swap in sub-image 3 so that sub-image 3 can be updated next;
(b) store portion of a in sub-image 3;
(c) update access status of 3 to most recently accessed, 1 to next most recently accessed and 2 to least recently accessed (2, 1, 3);
Step 4
(a) swap out sub-image 2 and swap in sub-image 4 so that sub-image 4 can be updated;
(b) store portion of a in sub-image 4;
(c) update access status of 4 to most recently accessed, 3 to next most recently accessed and 1 to least recently accessed (1, 3, 4), the image is now in the LRU initial state shown in FIG. 5b;
Step 5
(a) swap out sub-image 1 and swap in sub-image 2 so that sub-image 2 can be updated with a portion of rectangle b;
(b) store portion of b in sub-image 2;
(c) update access status of 2 to most recently used, 4 to next most recently used and 3 to least recently used (3, 4, 2);
Step 6
(a) swap out sub-image 3 and swap in sub-image 1 to update sub-image 1;
(b) store portion of b in sub-image 1;
(c) update access status of 1 to most recently used, 2 to next most recently used and 4 to least recently used (4, 2, 1);
Step 7
(a) swap out sub-image 4 and swap in sub-image 3;
(b) store portion of b in sub-image 3;
(c) update access status of 3 to most recently used, 1 to next most recently used and 2 to least most recently used (2, 1, 3);
Step 8
(a) swap out sub-image 2 in secondary storage and swap in sub-image 4 from secondary storage;
(b) store portion of b in sub-image 4; and
(c) update access status of 4 to most recently used, 3 to next most recently used and 1 to least recently used (1, 3, 4).

Using the normal LRU scheme required seven swap operations between primary and secondary storage to modify the image to add the circle a and rectangle b.

It is apparent from this example that the amount of swapping could have been reduced if the sub-image blocks were processed in an order based on knowledge of the state of primary storage. The occurrence of unnecessary swap out operations is referred to as thrashing. This thrashing can be significantly reduced by use of my modified LRU algorithm.

The number of swap cycles can be substantially reduced using the modifications provided by the present invention. With the present invention, the virtual storage manager generates an access list to the primary storage manager. The primary storage manager processes the list to determine which image to access first. As each sub-image can be processed independently of any other sub-image, the primary storage manager can arrange for the sub-images to be accessed in any order.

It accordingly accesses the sub-images in an order that will minimize store and fetch cycles between primary and secondary storage.

The virtual memory system first determines the set of sub-image blocks that must be accessed and then processes them in the order requiring minimal swapping cycles. The swap out logic preferentially keeps sub-image blocks in the access set list in primary storage.

In the example illustrated in FIGS. 5a and 5b, sub-image blocks 2, 3 and 4 are on both the access list and in primary storage. The sequence of operations would be as follows:

Step 1
(a) generate access set list for sub-images {1, 2, 3, 4};
(b) store portion of a in sub-image 2, as it is the least recently used and so is the least costly to access;
(c) remove sub-image 2 from access list leaving access list {1, 3, 4};
(d) update access status of 2 to most recently accessed, leaving primary storage in state (3, 4, 2);

Step 2
(a) store portion of a in sub-image 3 as it is the least recently used;
(b) remove sub-image 3 from access list, leaving access list {1, 4};
(c) update access status of 3 to most recently accessed, leaving primary storage in state (4, 2, 3);

Step 3
(a) store portion of a in sub-image 4;
(b) remove sub-image 3 from access list, leaving access list {1};
(c) update access status of 4 to most recently used, leaving primary storage in state (2, 3, 4);

Step 4
(a) swap out sub-image 2 and swap in sub-image 1;
(b) store portion of a in sub-image 1;
(c) remove sub-image 1 from active list, leaving access list empty;
(d) update access status of 1 to most recently used, leaving primary storage in state (3, 4, 1);

Step 5
(a) generate a new access list {1, 2, 3, 4} for rectangle b, as shown in the initial state for the modified LRU in FIG. 5b;
(b) store portion of b in sub-image 3;
(c) remove sub-image 3 from the access list, leaving access list {1, 2, 4};
(d) update access status of 3 to most recently used leaving primary storage in state (4, 1, 3);

Step 6
(a) store portion of b in sub-image 4;
(b) remove sub-image 4 from the access list, leaving access list {1, 2};
(c) update access status of 4 to most recently used, leaving primary storage in state (1, 3, 4);

Step 7
(a) store portion of b in sub-image 1;
(b) remove sub-image 1 from the access list, leaving access list {2};
(c) update access status of 1 to most recently used, leaving primary storage in state (3, 4, 1);

Step 8
(a) swap out sub-image 3 and swap in sub-image 2;
(b) store portion b in sub-image 2;
(c) remove sub-image 2 from the access list, leaving access list empty;
(d) update access status of 2, leaving primary storage in state (4, 1, 2).

As is readily apparent, the process of selecting the portion of the image on the access list and most readily available in primary storage has reduced the swap operations from seven for the unmodified LRU to only two for the modified LRU in the present simple example. As the changes become more complex, the savings in cycle times are increased in greater measure.

While specific embodiments of the invention have been described it is not intended that the invention be limited to those embodiments but should extend to other configurations which would be well within the skill of one knowledgeable in the art. For example, in the disclosed embodiments, a modified least recently used algorithm has been used to determine the order of transfer of sub-images between primary and secondary storage. Any one of many other well known algorithms could be used to enable the efficient transfer of image information. Also, although we have described a particular memory management approach, there are obviously alternative techniques that could be selected to perform the invention.

Having thus described my invention, what I claim as new, and so desire to secure by Letters Patent is:

1. An image processing system including a display device, a first store and a second store,
   means for loading digital representations of images to be displayed into said first and second stores, each said image being subdivided into a plurality of sub-images,
   a table associated with each image and each sub-image, each said table associated with each image defining view characteristics for said associated image, each said table for each said sub-image defining view characteristics for said associated sub-image,
   means for selecting a view of a stored image for display on said display device as a viewed image having view characteristics, said selecting means accessing said view of said stored image by selecting sub-images for display, said selecting means including means for comparing said view characteristics of said viewed image to said view characteristics of a selected sub-image and means for changing said view characteristics of said selected sub-image to the view characteristics of said viewed image before displaying said sub-image.

2. A method for displaying images comprising the steps of:
   subdividing each image into a plurality of rectangular sub-images,
   providing each image with a table containing information on the current viewing state of the image,
   providing each sub-image with a table containing information on the current viewing state of the sub-image,
   storing said sub-images and tables in a data storage device,
   selecting and displaying a desired view of a stored image on a display device as a viewed image having a view state, said selecting and displaying comprising the following steps:
   selecting a sub-image of said stored image for display,
   comparing the view state of said selected sub-image to the view state of said viewed image,
   altering said sub-image view state so as to conform with said viewed image view state,
   displaying said sub-image in said altered view state and
   repeating said selecting, comparing, altering and displaying steps for each sub-image to be displayed.

3. A method of manipulating images in a data processing system, said system including a display device, a primary store and a secondary store and means for controlling access to said primary and secondary stores, said method comprising the following steps:

subdividing each image to be stored into a plurality of rectangular sub-images, storing said sub-images in said primary store and said secondary store, said sub-images stored in said primary store being accessible for display by said display device, storing view status information for each image and each sub-image, selecting a stored image to be manipulated, creating an access list for said selected stored image, said access list identifying sub-images of said image required for performance of the manipulation, sequentially selecting and manipulating all sub-images on said access list which are stored in said primary store, restoring sub-images in said primary store to said secondary store when all sub-images on said access list which are in primary store have been accessed, said restored sub-images being transferred to said secondary store in an order which minimizes transfers between said primary and secondary stores, transferring a sub-image on said access list from said secondary store to said primary store, selecting and manipulating said most recently transferred sub-image, and continuing said steps of transferring from said secondary store and selecting and manipulating said most recently transferred sub-image until all sub-images on said access list are manipulated.

4. A method of modifying image information in a data processing system comprising the steps of:

subdividing each image stored in said system into a plurality of rectangular sub-images;

assigning a view state to each image indicating a current state in which said image can be viewed, assigning a view state to each sub-image, said sub-image view state indicating the state in which said sub-image is stored in said system; and selecting a view of a stored image, said view having a view state, said selecting step comprising:

accessing a sub-image of said stored image, comparing said view state of said accessed sub-image to the view state of said of selected view of said stored image;

modifying said accessed sub-image to change its view state to the view state of the selected view; and repeating said accessing, comparing and modifying steps for each of those sub-images of said selected image which are to be modified.

5. A method as defined in claim 4 wherein said sub-images are stored in primary and secondary stores and said sub-images are only accessible for display and modification when stored in said primary store, said method further comprising the steps of:

providing an access list of sub-images to be modified;

accessing sub-images on said access list in accordance with a priority scheme in which sub-images in said primary store are accessed prior to accessing sub-images which require fetch and store cycles.

6. A method of manipulating images within a data processing system comprising:

subdividing each image to be stored into a plurality of sub-images, maintaining a view state record for each image, maintaining a view state record for each sub-image of each image, selecting a view of a stored image, said view having a view state record, accessing sub-images of said selected image which include areas of said stored image requiring manipulation, comparing the view state record of each accessed sub-image with the view state record of the selected view, and conforming each said accessed sub-image view state and view state record to the view state and view state record of said selected view.

7. A method of manipulating images as defined in claim 6 wherein said data processing system has a primary store and a secondary store, said primary store being capable of storing only a portion of an image, said method further comprising the steps of:

accessing and manipulating sub-images stored in said primary store before sub-images stored in said secondary store are accessed;

swapping sub-images in said primary store for sub-images in said secondary store after all accessing and manipulating operations have been performed on said sub-images in said primary store; and accessing and manipulating said sub-images swapped into said primary store.

8. A method of manipulating images as defined in claim 7 wherein said primary store retains at least two sub-images.

9. A method of manipulating images as defined in claim 7 wherein said sub-images stored in said primary store have associated access indicators, each access indicator denoting how recently a sub-image has been accessed relative to other sub-images, whereby the least recently accessed sub-image may be overwritten by a sub-image swapped out from said secondary store.

10. A method of manipulating images as defined in claim 7 wherein said sub-images are accessed in an order that requires fewer swapping operations between said primary and secondary stores than would be required by accessing the subimages in a random order.

11. A method of manipulating images as defined in claim 10 wherein said sub-images in said primary store are replaced in accordance with a priority arrangement wherein sub-images in said primary store which are not on said access list and have not been modified are replaced first, sub-images not on said access list are replaced second and sub-images on said access list but not modified are replaced third.

12. A method of manipulating images as defined in claim 9 wherein said sub-images are stored in said secondary store in a compressed state.

13. A method of manipulating images as defined in claim 8 wherein said manipulating operations are selected from the group of operations including rotating an image, reflecting an image, inverting color pattern of an image, pattern filling an image, annotating an image with graphical and textual information, scaling an image and copying one image onto another image.

14. A method of manipulating images as defined in claim 8 wherein said manipulating operations can be performed on sub-images of an image in any order.

15. A method of manipulating images as defined in claim 8 wherein said sub-images are rectangular.

16. An image processing system as defined in claim 1 wherein said sub-images are stored in said second store in a compressed form.

17. An image processing system as defined in claim 1 further comprising means for indicating whether a sub-image in said primary store has been selected.

18. An image processing system as defined in claim 1 wherein said primary store has a storage capacity sufficient to store at least two sub-images.

19. An image processing system as defined in claim 1 wherein said sub-images are rectangular.

20. An image processing system for transforming a source image into a destination image, said source image comprising a plurality of source subimages, said destination image comprising a plurality of destination subimages, said system comprising:
   a first store;
   a second store;
   means for loading a digital representation of the source image into the second store;
   a source table associated with the source image, said source table defining the view characteristics of the source image;
   a destination table associated with the destination image, said destination table defining the view characteristics of the destination image;
   a source subimage table associated with each source subimage, each source subimage table defining the view characteristics of the associated source subimage;
   means for loading a first source subimage from the second store into the first store;
   means for comparing the view characteristics of the first source subimage in the first store with the view characteristics of the destination image and for transforming the first source subimage in the first store into at least one selected destination subimage in the first store having the view characteristics of the destination image;
   means for replacing the first source subimage in the first store with a second source subimage after transforming the first source subimage; and
   means for comparing the view characteristics of the second source subimage in the first store with the view characteristics of the destination image and for transforming the second source subimage in the first store into at least the one selected destination subimage in the first store having the view characteristics of the destination image.

21. A method of transforming a source image into a destination image, said source image comprising a plurality of source subimages, said destination image comprising a plurality of destination subimages, said method comprising the steps of:
   providing a first store;
   providing a second store;
   loading a digital representation of the source image into the second store;
   providing a source table associated with the source image, said source table defining the view characteristics of the source image;
   providing a destination table associated with the destination image, said destination table defining the view characteristics of the destination image;
   providing a source subimage table associated with each source subimage, each source subimage table defining the view characteristics of the associated source subimage;
   loading at least a first source subimage from the second store into the first store;
   comparing the view characteristics of the first source subimage in the first store with the view characteristics of the destination image and transforming the first source subimage in the first store into at least one selected destination subimage in the first store having the view characteristics of the destination image;
   replacing the first source subimage in the first store with a second source subimage after transforming the first source subimage; and
   comparing the view characteristics of the second source subimage in the first store with the view characteristics of the destination image and transforming the second source subimage in the first store into at least the one selected destination subimage in the first store having the view characteristics of the destination image.

* * * * *